(12) United States Patent
Song et al.

(10) Patent No.: US 9,443,028 B2
(45) Date of Patent: Sep. 13, 2016

(54) RELEVANCE ESTIMATION USING A SEARCH SATISFACTION METRIC

(75) Inventors: Yang Song, Kirkland, WA (US); Liwei He, Bellevue, WA (US); Ahmed Hassan Awadallah, Ann Arbor, MI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 792 days.

(21) Appl. No.: 12/965,864

(22) Filed: Dec. 11, 2010

(65) Prior Publication Data

US 2012/0150854 A1 Jun. 14, 2012

(51) Int. Cl.
*G06F 7/00* (2006.01)
*G06F 17/30* (2006.01)

(52) U.S. Cl.
CPC ... *G06F 17/30882* (2013.01); *G06F 17/30864* (2013.01)

(58) Field of Classification Search
CPC ............................................... G06F 17/30864
See application file for complete search history.

(56) References Cited

U.S. PATENT DOCUMENTS

| | | | |
|---|---|---|---|
| 6,993,586 B2 * | 1/2006 | Chen ...................... | G06F 17/18 707/E17.111 |
| 7,472,119 B2 | 12/2008 | Dai | |
| 7,716,225 B1 * | 5/2010 | Dean et al. .................. | 707/748 |
| 7,725,463 B2 | 5/2010 | Hurst-Hiller | |
| 8,082,511 B2 * | 12/2011 | Sobotka ................ | G06F 3/0482 715/745 |
| 2003/0212760 A1 * | 11/2003 | Chen et al. .................... | 709/218 |
| 2004/0034652 A1 * | 2/2004 | Hofmann ........ | G06F 17/306996 |
| 2005/0125392 A1 * | 6/2005 | Curtis et al. ...................... | 707/3 |
| 2007/0083506 A1 | 4/2007 | Liddell | |
| 2008/0114751 A1 * | 5/2008 | Cramer ............ | G06F 17/30554 |
| 2009/0037410 A1 | 2/2009 | Jones | |
| 2009/0193047 A1 | 7/2009 | Chen | |
| 2009/0248661 A1 * | 10/2009 | Bilenko ............ | G06F 17/30864 |
| 2010/0153357 A1 | 6/2010 | Slackman | |
| 2011/0029517 A1 * | 2/2011 | Ji et al. ......................... | 707/734 |
| 2011/0054999 A1 * | 3/2011 | Attenberg ......... | G06F 17/30864 705/14.43 |

OTHER PUBLICATIONS

Eugene Agichtein Eric Brill, title "Learning User Interaction Models for Predicting Web Search Result Preferences", 2006, Microsoft.*
Chapelle et al., Title "A dynamic Bayesian Network click model for web search ranking", 2009.*
Yuchen Zhang, Tittle "User-click Modeling for Understanding and Predicting Search-behavior", 2011.*

(Continued)

*Primary Examiner* — Loan T Nguyen
(74) *Attorney, Agent, or Firm* — Alin Corie; Doug Barker; Micky Minhas

(57) ABSTRACT

The subject disclosure is directed towards using a satisfaction model's prediction as to whether a user was satisfied or dissatisfied in satisfying a search goal to help estimate the relevance of a URL/document that was returned and clicked by the user. The clickthrough data for a search goal session is processed by either a utility model or a despair model based on whether the satisfaction model indicated that the search goal session ended with the user satisfied or dissatisfied, respectively. The utility model distributes a utility value to each clicked URL, while the despair model distributes a despair value to each clicked URL. The utility value and despair value of each query-URL pair may be used as corresponding feature data for learning a search ranker.

20 Claims, 4 Drawing Sheets

(56) References Cited

OTHER PUBLICATIONS

Mikhail Bilenko, "Mining the Search Trails of Surfing Crowds: Identifying Relevant Websites From User Activity", 2008.*

Dupret, Title "A Model to Estimate Intrinsic Document Relevance from the Clickthrough Logs of a Web Search Engine".2010.*

A Model to Estimate Intrinsic Document Relevance from the Clickthrough Logs of a Web Search Engine—Published Date: Feb. 6, 2010; http://wume.cse.lehigh.edu/~ovd209/wsdm/proceedings/docs/p181.pdf.

Optimizing Search Engines using Clickthrough Data—Published Date: 2002 http://www.cs.cornell.edu/People/tj/publications/joachims_02c.pdf.

Improving Web Search Ranking by Incorporating User Behavior Information—Published Date: 2006 http://citeseerx.ist.psu.edu/viewdoc/download?doi=10.1.1.120.1145&rep=rep1&type=pdf.

* cited by examiner

RELEVANCE ESTIMATION USING A SEARCH SATISFACTION METRIC

BACKGROUND

Web search engine logs are widely used for optimizing search engine performance. In particular, analyzing clickthrough data in the logs, which indicate when a search result has been clicked, is a significant part of search engine optimization. Clickthrough data is used as an indicator as to which documents users found as being relevant to a query.

However, interpreting clickthrough data for use in optimizing search engines is far from ideal, as the mere fact that a URL has been clicked is not necessarily a good indicator of its relevance to the query. Notwithstanding, existing optimization mechanisms tend to treat clickthrough data as a strong indicator. For example, some mechanisms that exploit clickthrough data assume that the user examined each document's information (e.g., title, snippet and so on) returned in a ranked list of search results, and clicked on the relevant documents. This is not what users do in many instances.

Other mechanisms assume that perceived relevance (i.e., attractiveness) is the same as actual relevance, or assume that all clicks provided the user with some satisfaction with respect to gaining useful information. Again, this not the case, as perceived relevance is often different from actual relevance, and many users are frequently unsatisfied with the search results returned for a query.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a determination as to whether a user was satisfied or dissatisfied with search results is used in helping determine the relevance of clickthrough data. The clickthrough data, which indicates which (zero or more) URLs were clicked after being returned as search results in response to a query, is accessed for a search goal session (e.g., corresponding to a user's search for information to satisfy a particular information need).

The clickthrough data for a search goal session is associated with satisfaction data that represents whether the search goal session ended with the user satisfied or dissatisfied with the search results. If the satisfaction results indicate that the session ended with the user satisfied, an amount of utility is associated with (e.g., distributed among) each clicked URL, which helps to make that document more relevant. If the satisfaction results indicate that the session ended with the user dissatisfied, an amount of despair is associated with (e.g., distributed among) each clicked URL, which helps to make that document less relevant. If no URLs were actually clicked, a number of URLs (e.g., the top two ranked) may be considered as having been effectively clicked.

In one aspect, data corresponding to the utility associated with a query-URL pair may be processed as a feature used in learning a search ranker. Similarly, data corresponding to the despair associated with the query-URL pair may be used as another feature. In this way, the utility score and the despair score for query-URL pair influence the relevance estimation for a document in search ranking.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using information regarding whether a user was satisfied or dissatisfied with a search session to obtain a utility feature value and/or despair feature value for use in training a search ranker. In general, an optimization mechanism uses a session level user satisfaction model to provide a further interpretation of clickthrough data, which results in tending to improve the estimation of document relevance using the search logs of a web search engine. The user satisfaction model tends to provide a more accurate interpretation of the context of why a user clicked on a search result for a query, and thus a further estimation of the document's relevance with respect to the query.

It should be understood that any of the examples herein are non-limiting. For example, various models and the like are used as examples herein, however other models than those exemplified may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
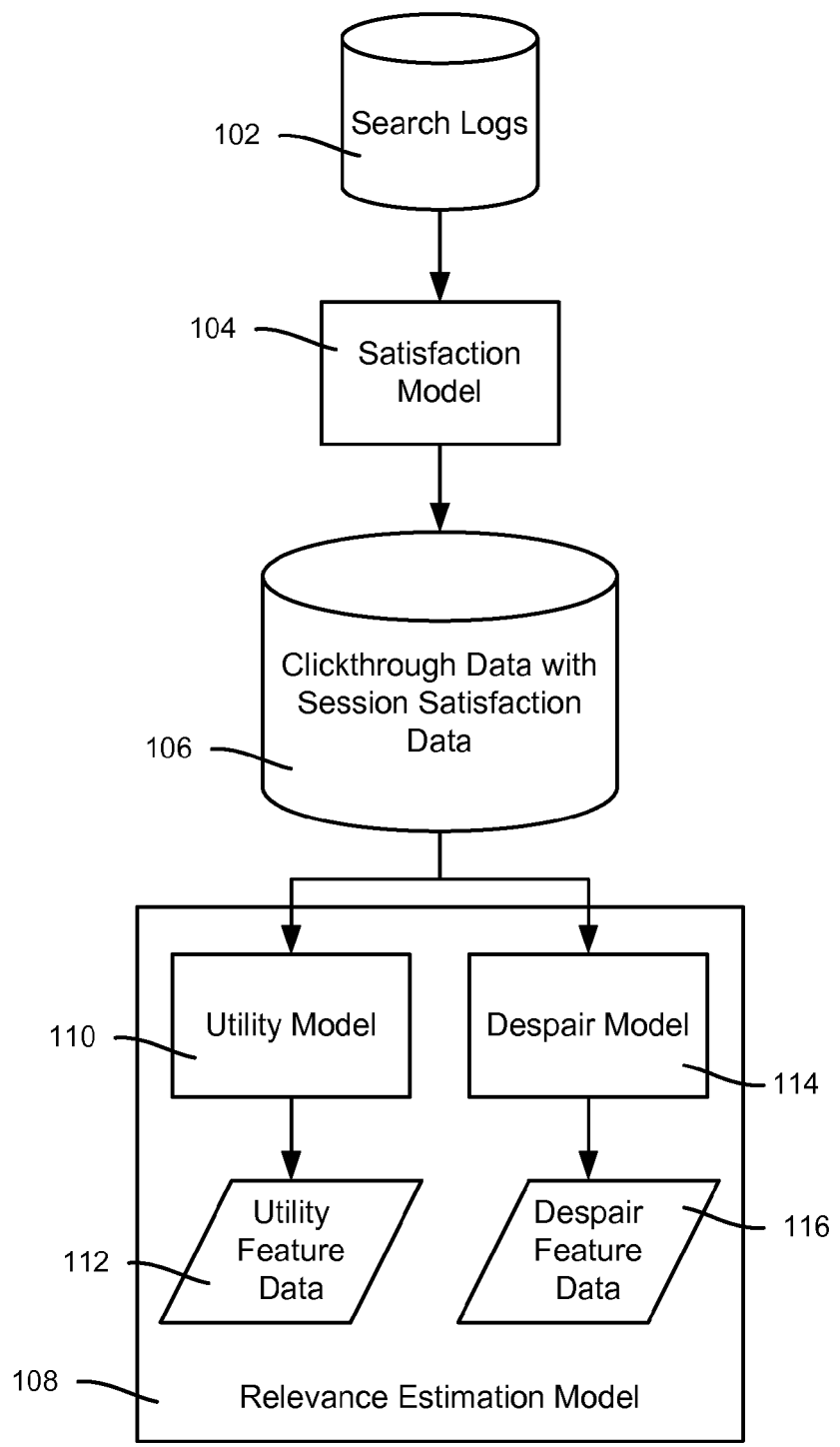
FIG. 1 is a block diagram representing example components in a system that inputs satisfaction data from a satisfaction model to obtain data useful in estimating a document's relevance with respect to a search query.

FIG. 1 shows one implementation comprising general components for document relevance estimation based upon user satisfaction with a set of search results. A system for estimating document relevance uses the search logs 102 of a web search engine, (and/or browser logs if available), and in general is based on analyzing the overall activity of users during a search goal session, where a search goal refers to an atomic information need that may result in one or more queries.

In one aspect, the interpretation of clickthrough data in the search logs 102 is improved by putting each click in some context. Note that although clickthrough data is correlated with relevance, there are several reasons why clickthrough data does not suffice as an explicit relevance measure. For example, when a user decides to clicks on a particular URL, the user is usually influenced by the results presentation, including the snippet, the position of different URLs, other displayed results, and so forth. When a user decides to click on a URL, the user is only guessing that this URL is relevant to the information need, which may or may not be correct.

As described herein the technology leverages a user satisfaction model 104 that makes a determination (predicts) whether the information need of the user has been met in a search session, that is, whether the user was satisfied or dissatisfied with respect to meeting that information need. To this end, sequence models are built that incorporate user behavior data to predict whether a user ended up being satisfied with a search or not.

The satisfaction model 104 thus provides additional information that is used as described herein in helping estimate the relevance of a particular document given the clickthrough data. One suitable satisfaction model is described by A. Hassan, R. Jones, and K. L. Klinkner, "*Beyond dcg: user behavior as a predictor of a successful search.*" In WSDM '10: Proceedings of the third ACM international conference on Web search and data mining, pages 221-230, New York, N.Y., USA, 2010, hereby incorporated by reference. Other satisfaction models are feasible.

As described herein, the output of the user satisfaction model 104 is further used to interpret the clickthrough data with respect to relevance estimation for documents. In general, a relevance estimation model 106 assumes that that users who end up being satisfied with their search, keep clicking on search results until they collect enough "utility" to satisfy their information need. Conversely, users who end up being dissatisfied with their search develop "despair" as they click on more and more irrelevant results. The relevance estimation model 106 assumes that users give up when they develop a certain amount of despair.

To this end, search goals (each corresponding to a search session as used herein) are collected from the search logs 102 and used in conjunction with the overall goal success metric provided by the satisfaction model 104 that predicts whether users ended up being satisfied or not with each search goal. For each document (query-URL pair) that was clicked during the session, the relevance model 106 uses the satisfaction data to estimate a value representative of utility (e.g., an average), and a value representative of despair (e.g., an average). To this end, for the clicks of a search goal session judged by the satisfaction model 104 to correspond to satisfied users, a utility model 110 computes a utility score based on the satisfaction data distributed (e.g., as described below) among the documents that were clicked, on a per-query basis. In one implementation this is used to compute corresponding feature data 112 (maintained along with other feature data) for each query-URL pair.

Further, for the clicks judged by the satisfaction model to correspond to dissatisfied users in search goal sessions, a despair model 114 similarly computes a despair score. In one implementation this is used to compute corresponding feature data 116 (maintained along with other feature data) for each query-URL pair.

The utility and despair feature data 112 and 116, respectively, may then be used in training (machine learning) a ranking function. Training a ranker with features/machine learning is well known and is not described herein, except to note that such utility and/or despair values obtained as described herein have not heretofore been used as features, and also that the values may be used for other purposes.

By way of example, consider a user was searching for some information need, in which in the search goal session the user clicked on two different URLs returned in response to the query, with neither fulfilling the information need. A system that uses clickthrough rate (CTR) as a predictor of actual relevance incorrectly concludes that the two URLs are relevant to the query because they were clicked. Assuming the satisfaction model 104 correctly predicted dissatisfaction, the relevance model 106 not only avoids the incorrect conclusion, but also reduces the predicted relevance of those clicked URLs, which tends to cause other, possibly more relevant, results to move up in the ranking.

Note that for a given session, the utility model 110 and despair model 114 mathematically distribute the respective utility value or despair value among the clicked URLs for that session, which may be distributed over the clicked URLs on a per-query basis, or distributed over the clicked URLs for all queries if more than one query was used in a session. In general, the number of documents a user clicks in satisfying a search goal says something about the relevance of each document, e.g., if a single document satisfied an information need, then that document is likely more relevant than if two documents were needed to satisfy that information need, and so on. A similar concept applies to despair, and thus the despair value is likewise mathematically distributed among the clicked documents.

With respect to distribution of the satisfaction results data, consider a user U1 who starts a search goal session to satisfy a certain information need. During the search session, the user clicked on three URLs, namely U1, U2, and U3, and the satisfaction model predicts that this user was satisfied with the search. As set forth above, the model is generally based on a likelihood that the user kept clicking on results until enough utility was collected, at which time the information need was met and the search activity concluded. Each result that was clicked likely contributed a certain amount of utility toward satisfying the information need.

In general, distribution is directed toward assigning a particular amount of utility to each clicked URL that appeared in the results. One distribution mechanism that may be implemented in the utility model 110 operates to distribute the utility uniformly between the clicked URLs, that is:

$$\text{Util}(u_i) = \frac{1}{n}$$

where n is the number of results that were clicked.

Another distribution mechanism that may be implemented in the utility model 110 distributes the utility among the clicked results based upon the order in which each result was clicked, e.g., proportional to the order, on the basis that the URL's place in the click order may correspond to the amount of utility gained. For example, one way to compute click order-related utility is:

$$\text{Util}(u_i) = \frac{2*i}{n(n+1)}$$

where i is the order of the click and n is the number of results that were clicked.

Yet another distribution mechanism that may be implemented in the utility model 110 assumes that the more time a user spends reviewing the document that corresponds to a clicked URL, the more utility was gained from that document. In other words, the utility gain from a particular click is proportional its dwell time, and may be computed as:

$$\text{Util}(u_i) = \frac{T_i}{\sum_{j=1}^{n} T_j}$$

where $T_i$ is the dwell time of the click with order i, and n is the number of results that were clicked.

Note that the above-described distribution mechanisms are only examples, and that other distribution mechanisms may be used.

With respect to distributing despair among clicked URLs, consider that a user starts another search and then clicks on some results. In this case, the satisfaction model predicted that this user was not satisfied with the search, that is, the user kept trying to fulfill an information need until finally giving up. As used herein, the user developed a certain amount of "despair," and each click that the user made contributed something to that despair.

Despair may be distributed among clicked URLs in the same way as for utility, and thus a description of the despair distribution mechanisms is not repeated herein. Note however that the distribution mechanism used need not be the same for utility as for despair, e.g., utility may be computed using the dwell time mechanism for the utility feature, while despair may be computed using the uniform distribution mechanism, or the click-order mechanism.

It is also feasible that after the user receives the search results for a query and reviews at least some of the results, the user decides to not click on any of the results. In the event that a user does not click on any results, one despair model assumes that at least the titles and snippets of the first two results were examined, but not determined to be relevant. In one implementation, these top two URLs are treated as if they were clicked, but added to the user's despair. While other implementations may make other assumptions, eye tracking studies have shown that the mean time that users fixate on a presented result is almost equal for the top two ranked links, and drops sharply after the second link. Thus, one implantation treats the top two documents as being effectively clicked on the assumption that they likely contributed something to the user's amount of despair with respect to the search results for the query.

Figure 2:
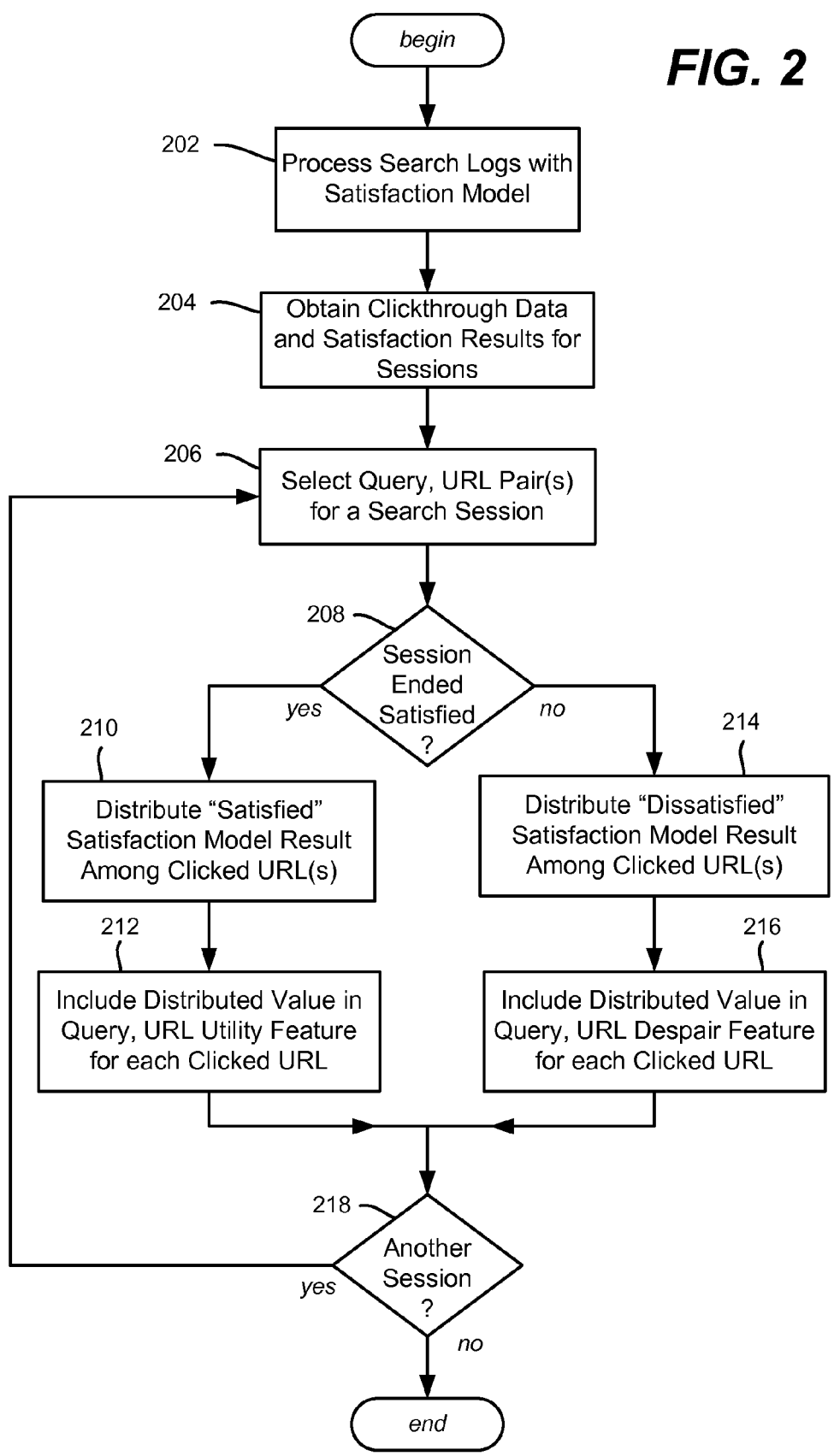
FIG. 2 is a flow diagram representing example steps in obtaining utility and despair data based in part on a search satisfaction metric that may be used in estimating a document's relevance with respect to a search query.

FIG. 2 summarizes some example steps that may be taken to obtain and distribute the utility and despair values that may be used in computing corresponding features for training a ranker. Step 202 represents processing the search log to locate search goal sessions and determine via the satisfaction model whether each session ended with the user being satisfied or dissatisfied. This information is then provided to the relevance estimation model at step 204. Note that the session determination, satisfaction processing and relevance estimation processing may be done together, however FIG. 2 represents the session determination and satisfaction data per session as having been performed in advance of relevance estimation processing.

Step 206 selects the clicked query-URL pairs (if any) for a currently selected session. If the session ended with the user satisfied as predicted by the satisfaction model, step 208 branches to step 210, which distributes the satisfied result among the clicked URLs (or to the one URL if only one was clicked) as the utility value for that URL. Note that in one implementation the "satisfied" result may be the same value for every session, however it is feasible to have a satisfaction model that outputs a value indicating of a level of satisfaction, e.g., very satisfied, somewhat satisfied, barely satisfied, and the like. For each clicked URL in the session, step 212 includes the utility value after distribution in the corresponding utility feature data for that query-URL pair, e.g., mathematically combines the utility value with any already existing utility feature value associated with that pair.

If the session ended with the user dissatisfied as predicted by the satisfaction model, step 208 branches to step 214, which distributes the dissatisfied result among the clicked URLs (or to the one URL if only one was clicked) as the despair value for that URL. Note that like the "satisfied" result, the "dissatisfied" result may be the same value for every session, but alternatively may be a value indicating of a level of dissatisfaction. Further note that a session with no clicks is considered as contributing to despair as if some number (e.g., the top two) of URLs was effectively clicked. For each clicked (or effectively clicked) URL in the session, step 216 includes the despair value after distribution in the corresponding utility feature data for that query-URL pair, e.g., mathematically combines the despair value with any already existing despair feature value associated with that pair.

Step 218 repeats the process for the next session, and so on, until no sessions remain. Note that the same query-URL pair in a session that ended with the user satisfied may be present in a different session that that ended with the user dissatisfied, and thus the same query-URL pair may have both a utility feature value and a despair feature value.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 3:
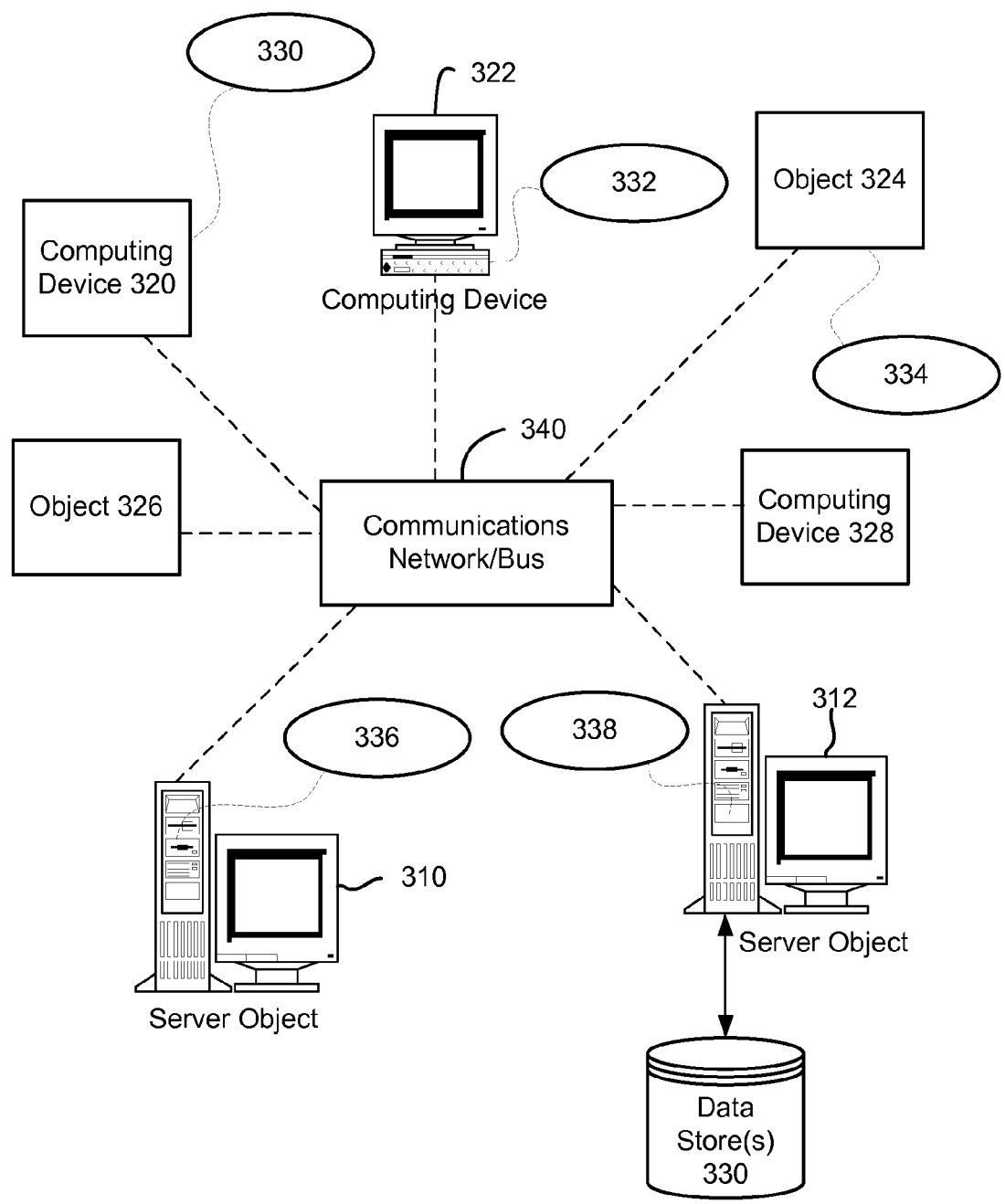
FIG. 3 is a block diagram representing exemplary non-limiting networked environments in which various embodiments described herein can be implemented.

FIG. 3 provides a schematic diagram of an exemplary networked or distributed computing environment. The distributed computing environment comprises computing objects 310, 312, etc., and computing objects or devices 320, 322, 324, 326, 328, etc., which may include programs, methods, data stores, programmable logic, etc. as represented by example applications 330, 332, 334, 336, 338. It can be appreciated that computing objects 310, 312, etc. and computing objects or devices 320, 322, 324, 326, 328, etc. may comprise different devices, such as personal digital assistants (PDAs), audio/video devices, mobile phones, MP3 players, personal computers, laptops, etc.

Each computing object 310, 312, etc. and computing objects or devices 320, 322, 324, 326, 328, etc. can communicate with one or more other computing objects 310, 312, etc. and computing objects or devices 320, 322, 324, 326, 328, etc. by way of the communications network 340, either directly or indirectly. Even though illustrated as a single element in FIG. 3, communications network 340 may comprise other computing objects and computing devices that provide services to the system of FIG. 3, and/or may represent multiple interconnected networks, which are not shown. Each computing object 310, 312, etc. or computing object or device 320, 322, 324, 326, 328, etc. can also contain an application, such as applications 330, 332, 334, 336, 338, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 3, as a non-limiting example, computing objects or devices 320, 322, 324, 326, 328, etc. can be thought of as clients and computing objects 310, 312, etc. can be thought of as servers where computing objects 310, 312, etc., acting as servers provide data services, such as receiving data from client computing objects or devices 320, 322, 324, 326, 328, etc., storing of data, processing of data, transmitting data to client computing objects or devices 320, 322, 324, 326, 328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 340 or bus is the Internet, for example, the computing objects 310, 312, etc. can be Web servers with which other computing objects or devices 320, 322, 324, 326, 328, etc. communicate via any of a number of known protocols, such as the hypertext transfer protocol (HTTP). Computing objects 310, 312, etc. acting as servers may also serve as clients, e.g., computing objects or devices 320, 322, 324, 326, 328, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 4 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 4:
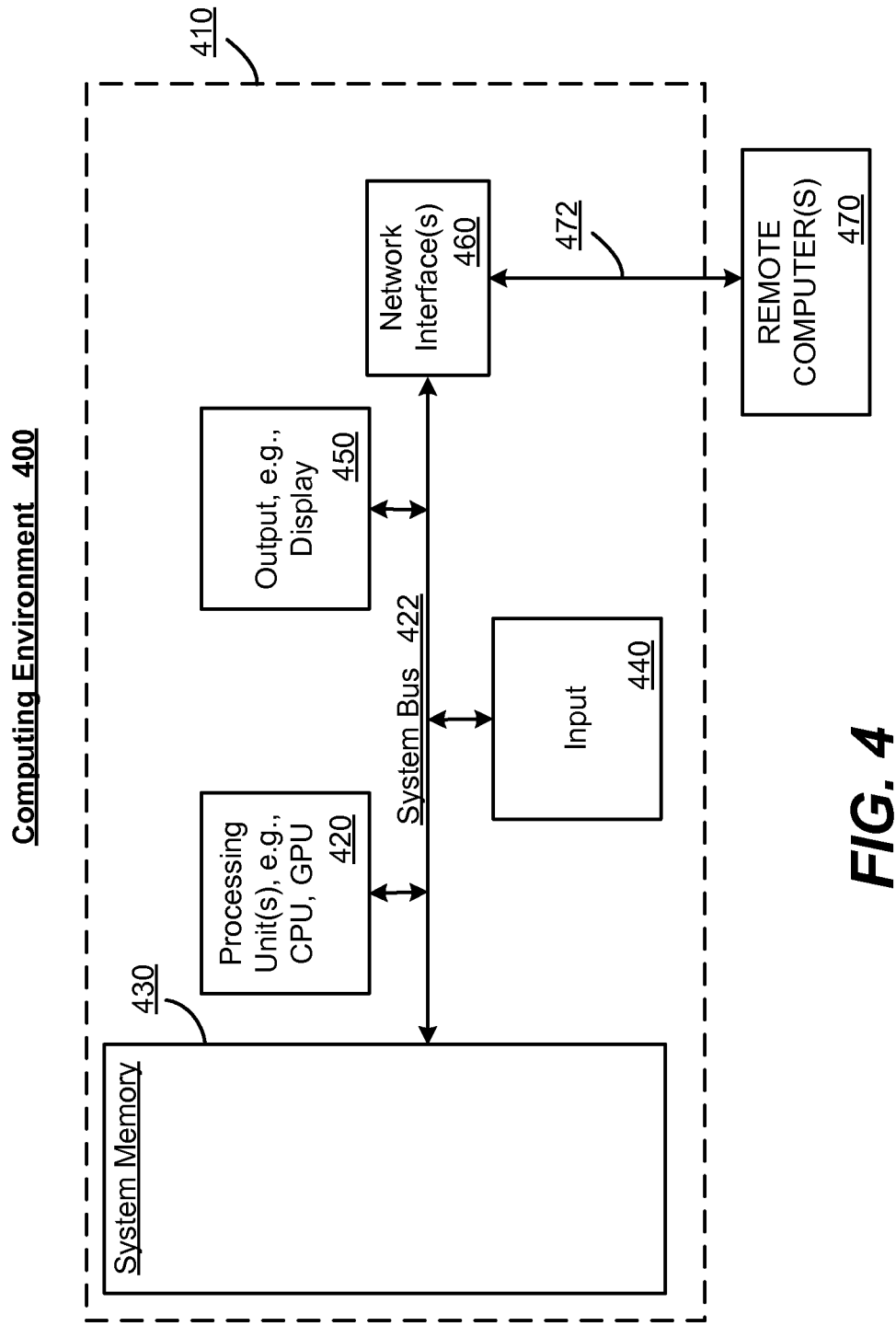
FIG. 4 is a block diagram representing an exemplary non-limiting computing system or operating environment in which one or more aspects of various embodiments described herein can be implemented.

FIG. 4 thus illustrates an example of a suitable computing system environment 400 in which one or aspects of the embodiments described herein can be implemented, although as made clear above, the computing system environment 400 is only one example of a suitable computing environment and is not intended to suggest any limitation as to scope of use or functionality. In addition, the computing system environment 400 is not intended to be interpreted as having any dependency relating to any one or combination of components illustrated in the exemplary computing system environment 400.

With reference to FIG. 4, an exemplary remote device for implementing one or more embodiments includes a general purpose computing device in the form of a computer 410. Components of computer 410 may include, but are not limited to, a processing unit 420, a system memory 430, and a system bus 422 that couples various system components including the system memory to the processing unit 420.

Computer 410 typically includes a variety of computer readable media and can be any available media that can be accessed by computer 410. The system memory 430 may include computer storage media in the form of volatile and/or nonvolatile memory such as read only memory (ROM) and/or random access memory (RAM). By way of example, and not limitation, system memory 430 may also include an operating system, application programs, other program modules, and program data.

A user can enter commands and information into the computer 410 through input devices 440. A monitor or other type of display device is also connected to the system bus 422 via an interface, such as output interface 450. In addition to a monitor, computers can also include other peripheral output devices such as speakers and a printer, which may be connected through output interface 450.

The computer 410 may operate in a networked or distributed environment using logical connections to one or more other remote computers, such as remote computer 470. The remote computer 470 may be a personal computer, a server, a router, a network PC, a peer device or other common network node, or any other remote media consumption or transmission device, and may include any or all of the elements described above relative to the computer 410. The logical connections depicted in FIG. 4 include a network 472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
   processing search goal session data obtained from a search log, the search goal session comprising a plurality of queries, the search goal session data including information that indicates any uniform resource locator (URL) that was clicked after being returned in search results corresponding to at least one query;
   inputting satisfaction results for a query-URL pair, the satisfaction results comprising a value indicative of a user satisfied or dissatisfied with satisfying an information need corresponding to the search goal session; and
   if the satisfaction results indicate that a query within the plurality of queries ended with the user dissatisfied, associating some amount of despair with each clicked query-URL pair for the search goal session, including selecting one or more URLs as effectively clicked and associating some amount of despair with each effectively clicked URL.

2. The method of claim 1 further comprising, if the satisfaction results indicate that a query within the plurality of queries ended with the user satisfied, associating some amount of utility with each clicked URL.

3. The method of claim 1 wherein the information that indicates any URL that was clicked indicates that no URL was clicked, wherein the satisfaction results indicate that a query within the plurality of queries ended with the user dissatisfied.

4. The method of claim 3 wherein selecting the one or more URLs as effectively clicked comprises selecting the top two ranked URLs as being effectively clicked.

5. The method of claim 1 wherein associating some amount of despair with each clicked URL comprises distributing a despair value between two or more URLs.

6. The method of claim 5 wherein distributing the despair value comprises uniformly distributing an amount of the despair value to each of the two or more URLs.

7. The method of claim 5 wherein distributing the despair value comprises, for each URL, computing an amount of the despair value based on a click order of that URL and associating the amount of despair value with that URL.

8. The method of claim 5 wherein distributing the despair value comprises, for each URL, computing an amount of the despair value based on a dwell time corresponding to that URL and associating the amount of despair value with that URL.

9. The method of claim 1 further comprising, using data corresponding to the amount of despair in computing despair feature data of a query-URL pair, in which the despair feature data is used in training a search ranker.

10. In a computing environment, a system comprising at least one processor, a memory communicatively coupled to the at least one processor and including components comprising: a relevance estimation model configured to input clickthrough data for a search goal session comprising a plurality of queries that indicates any uniform resource locator (URL) that was clicked in a query, the relevance estimation model further configured to input satisfaction data from a satisfaction model that indicates, for each query, whether the query ended with the user satisfied or dissatisfied; and the relevance estimation model coupled to a utility model, or to a despair model, or to both a utility model and a despair model, the utility model configured to associate a utility value with one or more clicked URLs for the search goal session when the query ended with the user satisfied, and the despair model configured to associate a despair value with one or more clicked or effectively clicked URLs when the query ended with the user dissatisfied, including selecting two or more URLs as effectively clicked and distributing a despair value between the or more effectively selected URLs.

11. The system of claim 10 wherein the utility model is configured to associate the utility value with the one or more clicked URLs via a utility distribution mechanism that distributes an amount of utility corresponding to the satisfaction data to each clicked URL.

12. The system of claim 11 wherein the utility distribution mechanism comprises at least one of a uniform distribution mechanism, a click-order distribution mechanism, or a dwell time distribution mechanism.

13. The system of claim 10 wherein the utility value associated with each clicked URL is used in computing a corresponding utility feature value used in learning a search ranker.

14. The system of claim 10 wherein the despair model is configured to associate the despair value with the one or more clicked or effectively clicked URLs via a despair distribution mechanism that distributes an amount of despair corresponding to the satisfaction data to each clicked URL.

15. The system of claim 14 wherein the despair distribution mechanism comprises a uniform distribution mechanism, a click-order distribution mechanism, or a dwell time distribution mechanism.

16. The system of claim 10 wherein the despair model is configured to select one or more URLs that have not been clicked as effectively clicked URLs.

17. The system of claim 10 wherein the despair value associated with each clicked URL is used in computing a corresponding despair feature value used in learning a search ranker.

18. An article of manufacture comprising one or more computer-readable storage devices having computer-executable instructions, which when executed perform steps, comprising:
    accessing clickthrough data for a search goal session comprising a plurality of queries, the clickthrough data indicating which zero or more uniform resource locators (URLs) were clicked after being returned as search results in each query within the plurality of queries, in which the clickthrough data is associated with satisfaction data that represents whether the query ended with a user satisfied or dissatisfied with the search results; and
    processing the clickthrough data, and if the satisfaction results indicate that the query ended with the user satisfied, distributing an amount of utility to each clicked URL for the search goal session, and if the satisfaction results indicate that the query ended with the user dissatisfied, distributing an amount of despair for the search goal session to each clicked or effectively clicked URL, including selecting one or more URLs as effectively clicked and associating some amount of despair with each effectively clicked URL.

19. The article of claim 18 having further computer-executable instructions comprising, using data corresponding to the utility associated with a query-URL pair as one feature used in learning a search ranker, and using other data corresponding to the despair associated with the query-URL pair as another feature used in learning the search ranker.

20. The article of claim 18 having further computer-executable instructions comprising, selecting the one or more URLs as effectively clicked when the satisfaction results indicate that the query ended with the user dissatisfied and the clickthrough data indicates that no URL was actually clicked.

* * * * *